Figure 1:
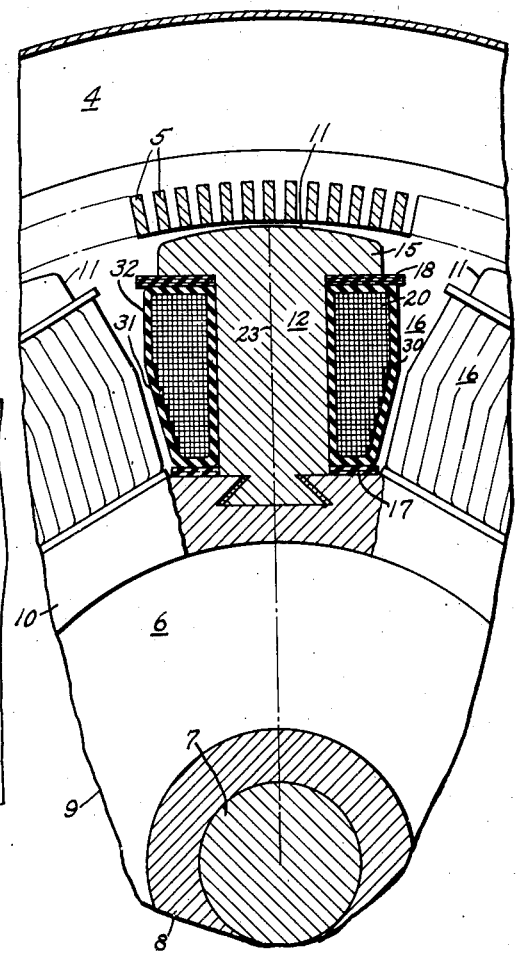

June 21, 1949.  J. S. ASKEY  2,473,842

DYNAMOELECTRIC MACHINE FIELD COIL

Filed Jan. 25, 1947

WITNESSES:
Leon M. Garman
Nw. C. Groome

INVENTOR
John S. Askey.
BY O. B. Buchanan
ATTORNEY

Patented June 21, 1949

2,473,842

UNITED STATES PATENT OFFICE 2,473,842

DYNAMOELECTRIC MACHINE FIELD COIL

John S. Askey, Pittsburgh, Pa., assignor to Westinghouse Electric Corporation, East Pittsburgh, Pa., a corporation of Pennsylvania Application January 25, 1947, Serial No. 724,343

20 Claims. (Cl. 171—252)

My invention relates to a special design or construction of a coil for one of the field-poles of a salient-pole, rotating-field, synchronous dynamoelectric machine, or other piece of electrical apparatus having one or more depressions in its outer surface.

What is meant is this. The field-coils of rotating-field synchronous motors have commonly been built with a plurality of layers of turns of a rectangular-sectioned double-cotton-insulated wire, with insulating bonding-material for holding together all of the turns in a single solid mass, and with a plurality of the outer layers of turns stepped back, with fewer turns, so as to be successively shorter, as measured parallel to the centerline of the coil, as the outermost winding-layer is approached during the winding-process, so as to provide a tapered outer configuration having discrete steps at the stepped-back places. These field-coils have been placed on the salient field-poles of the rotor-member of the machine, with the tapered ends of the coils disposed toward the shaft, so that the tapered ends of adjacent coils will not interfere with each other when there are a large number of poles. This has been the usual construction.

When such synchronous motors have been utilized for dirty applications, such as, for driving Banbury mixers in rubber mills, it has been customary to clean the motors at frequent intervals, as during the customary week-end layover-periods, when the machine was not in use. For many years, the accepted preferred cleaning-method was by means of blowing off the surfaces of the field-coils with compressed air. This air-pressure had to be high enough to dislodge the closely adhering dirt, but it was also necessary to avoid too great an air-pressure (in excess of sixty pounds per square inch) which might result in loosening the binding tape and blowing dirt under the same.

Attempts to apply the very desirable synchronous-motor drive in still dirtier applications, such as driving Banbury mixers in synthetic-rubber plants, have met with failure whenever the synchronous motors have used rotating field-coils of any previously known design. Careful investigation has indicated that these failures resulted from very tenaciously adhering films of highly conducting carbon-black, which caused surface flashovers over the surfaces of the field-coils. Carbon-black has always been used in the rubber industry, and it has always been the principal ingredient of the dirt which had to be removed from the surfaces of the field-coils. The synthetic-rubber industry, however, requires a special kind of carbon-black, which is approximately a hundred times more conducting and more adhesive, than the previously used carbon-black, and of finer particle-size. Moreover, the synthetic-rubber industry commonly runs on a seven-day week, on a twenty-four-hour schedule, so that there are no "customary" week-end layoff periods during which the motors would ordinarily be cleaned.

It was further found, particularly with this new form of carbon-black, that the time-honored process of blowing it off, with compressed air, was not satisfactory, particularly in plants using a large number of motors, because the dirt blown off of one motor would simply redistribute itself on the other motors, and would still cause trouble. It was learned that a preferred cleaning-method would be to use suction, rather than compressed air, but even with this preferred cleaning-method, flashovers were obtained, with conventional coil-designs, in as little as three weeks time, and such flashovers usually resulted in sufficient damage to require a shutdown for repairs.

The design-problem, for correcting the above-outlined difficulties, has been complicated by two additional requirements, namely, that any coil-surface treatment, for mitigating flashovers, had to be sufficiently strong, mechanically, to withstand the rather high centrifugal forces which are encountered in the rotors of such machines, and it also had to provide a good thermal conducting path for dissipating the heat which is generated in the field-coils.

The object of my present invention is to provide a novel field-coil construction, and method of construction, which will not only mitigate the difficulties which have been outlined above, but which will provide even superior heat-withstanding ability, and a higher rate of heat-conduction, so that the entire rating of the machine could be increased, in some instances, and so that the necessary cleaning-periods could be reduced to only such periods as might be necessary for preventing the complete clogging of the available ventilating spaces in the machine.

Figure 2:
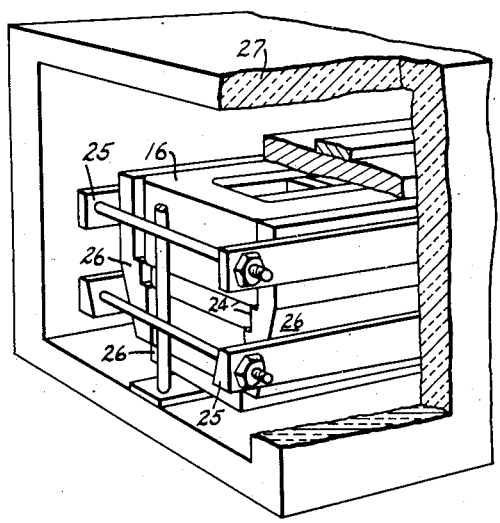
Figure 3:
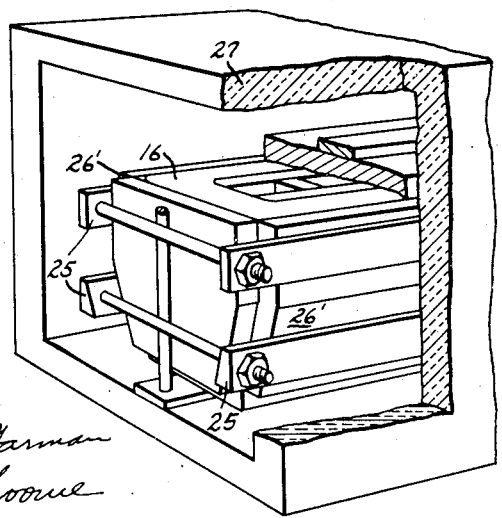
Figure 4:
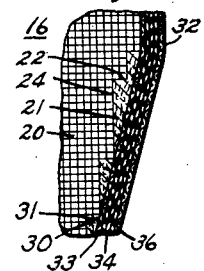

With the foregoing and other objects in view, my invention consists in the machines, combinations, parts, coils, finishes, and manufacturing methods hereinafter described and claimed, and illustrated in the accompanying drawing, wherein:

Figure 1 is a fragmentary transverse section view of a part of a synchronous motor embodying my invention, with one of the field-coils shown in section, to illustrate its construction, Figs. 2 and 3 are diagrammatic views illustrating two of the steps in the process of manufacturing the coil, and Fig. 4 is an enlarged detail of a portion of a field-coil.

Figure 1 shows my invention as being applied, by way of example, to a twelve-pole synchronous motor having a stator-member 4 which carries a primary winding 5 and a salient pole rotor-member 6 which is carried by a shaft 7. The rotor-member 6 is shown as comprising a hub 8, a flange or spider-member 9 extending outwardly therefrom, and a circumferential rim-member 10. The twelve field-poles 11 are secured to the rim-member 10, as shown.

Each of the field-poles 11, in the illustrated form of motor, comprises a salient pole-piece 12, the inner end of which is dovetailed to a base or lower coil-support which is shown as the rim-member 10. The outer end of each pole-piece 12, near the airgap of the machine, is provided with an enlarged pole-face portion 15, which provides a shoulder for retaining the field-coil 16 against centrifugal force. The inner and outer ends of the coil 16 are usually protected by molded laminated insulating washers 17 and 18 respectively.

Each coil 16 is separately wound, before being applied to its pole-piece. Each coil 16 comprises, as has been previously known, a plurality of layers of turns of a rectangular-sectioned insulated wire 20, but, in utilizing my invention, I prefer to utilize a glass-insulated wire, rather than a double-cotton-covered wire, the glass insulation being spun onto the wire in the same manner as the double-cotton covering has commonly been spun on. The glass insulation offers two important advantages, namely, better heat-conductivity, owing to the mineral composition of the glass, as compared to cotton, and the ability to withstand much higher temperatures.

In the process of winding the coil 16, after each layer of a plurality of turns has been wound, a polymerizing compound, consisting of a synthetic resin using a filler of powdered silica, is brushed onto that layer, as at 21, before the next layer is wound. As the winding-process approaches completion, a plurality of the outer layers of turns are stepped back, with fewer turns, as indicated at 22, so as to be successively shorter, as measured parallel to the centerline 23 of the coil, as the outermost winding-layer is approached during the winding-process, so as to provide a tapered outer configuration having discrete steps 24 at the stepped-back places.

The partly completed coil, as thus far constructed, is then compressed, by means of suitable clamps 25 and clamp-plates 26, applying pressure to the coil, and it is heated in an oven 27, as shown in Fig. 2, for a suitable length of time to harden or set the polymerizing compound or other insulating bonding-material, so that all of the turns of the coil will be held or bonded together in a single solid mass; after which, the coil is removed from the clamps and the oven. The clamping-plates 26 are stepped, to match the discrete steps 24 of the tapered portion of the coil 16. Thus far, except for the use of the glass insulation and the powdered-silica filler, the coil is conventional in design. The function of the glass insulation has already been described. The function of the powdered-silica filler is to completely fill all of the interstices within the coil, and to provide a solid or mineral heat-conducting path which provides a very much better heat-conductivity than could otherwise be provided.

In accordance with my invention, a further special finishing-treatment is then applied to the solidified coil 16, after it comes out of the oven 27 after the pressure- and heat-hardening operation which has just been described. As shown in Figs. 1 and 4, a filling 30 of an inorganic insulating cement is next applied, usually with a putty knife, so as to completely fill the discrete steps 24 of the tapered outer surface of the coil 16, said cement having a substantially uniformly tapered or smooth outer surface 31. This cement 30 comprises a synthetic resin, and it preferably has a filler of glass-fiber or other particulate filler of reasonably good heat-conducting qualities. The mineral quality of the glass-fiber or other particulate filler not only contributes a good heat-conducting quality to the cement filler 30, but it also serves to fill up all interstices and avoid the presence of voids or air-pockets in the insulation, which would reduce the heat-conducting qualities of the covering to such an extent that the design would probably be altogether impractical without it.

To protect this type of coil to a maximum degree requires enveloping the coil with a continuous insulation 32 of a type which will have the necessary mechanical strength to withstand handling and the centrifugal forces, which will have the necessary heat-conductivity, and which will have the necessary smooth glossy outer surface which is needed in order to repel the accumulation of dirt. This enveloping insulation or encapsulation 32 could not successfully be applied to the coil, without first applying the heat-conducting, electrically insulating, filler 30 to the tapered portion of the coil, so as to provide a smooth tapered outer surface 31 in place of the stepped tapered portion 24 of the coil-proper.

Preferably, the encapsulating covering 32 consists of a plurality of different layers, as shown in Fig. 4. First, there is a layer of glass tape 33, which is applied to the coil, this glass tape having sufficient mechanical strength so that it can be pulled more tightly into the still soft cement-filling 30, than could be done with mica tape. Then this glass-tape layer 32 is brushed with a synthetic thermo-setting varnish, after which, three layers of a cloth-backed mica tape 34 are then applied, with a synthetic thermo-setting varnish brushed over each layer separately, before the next layer is applied. As is usual, in the use of mica tape, the cloth backing is always on the outside. And finally, an outer layer of an impregnated glass tape 36 is applied, glass tape being utilized so that it can be pulled down tightly over the coil.

After this taping-operation has been completed, the coil is again pressed, as shown in Fig. 3, using the clamps 25, and different clamping-plates 26', the latter being again shaped so as to conform with the outer surface of the coil which is being pressed, this being now a smooth, unstepped surface, and the whole is then subjected to another heating-treatment, while under pressure, in the oven 27, as shown in Fig. 3. This again sets the cement, varnish and impregnant, and produces a hard solid mass, with a smooth glossy outer surface which is able to successfully resist the deposition of fine lamp-black or other dirt.

Although I could utilize any hardenable binder,

I prefer to use a polymerizing compound. Such a compound can be either a thermo-setting varnish or a synthetic resin. A thermo-setting varnish is capable of baking, with a smooth hard finish, without the application of pressure. A synthetic resin requires pressure, as well as heat, in order to set or harden, and it has better adhesive properties than varnish. The varnish, on the other hand, provides a better surface-finish, and is preferable for use as the impregnant or ingredient of the final coating on the coil, before each heating-operation.

Experience has shown that my coil has such a superior dirt-resistant surface, that no motor-cleaning operations are ever required, because of the condition of the coil-surface, but only insofar as may be necessary for preventing the more or less complete clogging of the ventilating passages of the machine. At the same time, my new coil has such superior heat-conducting qualities, coupled with an adequate high-temperature withstandability, so that the electrical rating of the coil can usually be very considerably increased, over the ratings which were possible with previously known coils.

While I have illustrated my invention in but a single exemplary form of embodiment, I wish it to be understood that my invention is not limited to the precise form of construction or processes, or to the specific application to the construction of rotor-coils for salient-pole synchronous machines. I desire, therefore, that the appended claims shall be accorded the broadest construction consistent with their language.

I claim as my invention:

1. A coil for one of the field-poles of a salient-pole, rotating-field, synchronous dynamo-electric machine, said coil comprising a plurality of layers of turns of a rectangular-sectioned, glass-insulated wire, with insulating bonding-material for holding together all of the turns in a single solid mass, and with a plurality of the outer layers of turns stepped back, with fewer turns, so as to be successively shorter, as measured parallel to the centerline of the coil, as the outermost winding-layer is approached during the winding-process, so as to provide a tapered outer configuration having discrete steps at the stepped-back places, a filling of an inorganic insulating cement completely filling said discrete steps of the tapered portion, said cement having a substantially uniformly tapered outer surface, said cement comprising a particulate filler of reasonably good heat-conducting qualities, and a binder, and an encapsulating casing of wrapped tape and a binder, with a hard outside-finish, surrounding the entire coil.

2. A coil for one of the field-poles of a salient-pole, rotating-field, synchronous dynamo-electric machine, said coil comprising a plurality of layers of turns of a rectangular-sectioned, glass-insulated wire, with insulating bonding-material for holding together all of the turns in a single solid mass, and with a plurality of the outer layers of turns stepped back, with fewer turns, so as to be successively shorter, as measured parallel to the centerline of the coil, as the outermost winding-layer is approached during the winding-process, so as to provide a tapered outer configuration having discrete steps at the stepped-back places, a filling of an inorganic insulating cement completely filling said discrete steps of the tapered portion, said cement having a substantially uniformly tapered outer surface, said cement comprising glass-fiber and a binder, and an encapsulating casing of wrapped tape and a binder, with a hard outside-finish, surrounding the entire coil.

3. The invention as defined in claim 1, characterized by said insulating bonding-material, for holding together all of the turns in a solid mass, including a particulate filler of reasonably good heat-conducting qualities, for filling all interstices in the coil.

4. The invention as defined in claim 1, characterized by said encapsulating casing comprising a first layer of glass-tape, an outer coating of a thermo-setting varnish over said first layer, one or more intermediate layers of cloth-backed mica-tape over said first layer, with the cloth outside, and with an outer coating of a thermo-setting varnish over each of said intermediate layers, and another layer of an impregnated glass-tape over said intermediate layers.

5. The invention as defined in claim 2, characterized by said encapsulating casing comprising a first layer of glass-tape, an outer coating of a thermo-setting varnish over said first layer, one or more intermediate layers of cloth-backed mica-tape over said first layer, with the cloth outside, and with an outer coating of a thermo-setting varnish over each of said intermediate layers, and another layer of an impregnated glass-tape over said intermediate layers.

6. A synchronous dynamo-electric machine comprising a stator-member and a rotor-member, said rotor-member being the field member and having a plurality of salient poles, each pole having a field-coil thereon, each coil comprising a plurality of layers of turns of a rectangular-sectioned, glass-insulated wire, with insulating bonding-material for holding together all of the turns in a single solid mass, and with a plurality of the outer layers of turns stepped back, with fewer turns, so as to be successively shorter, as measured parallel to the center-line of the coil, as the outermost winding-layer is approached during the winding-process, so as to provide a tapered outer configuration having discrete steps at the stepped-back places, a filling of an inorganic insulating cement completely filling said discrete steps of the tapered portion, said cement having a substantially uniformly tapered outer surface, said cement comprising a particulate filler of reasonably good heat-conducting qualities, and a binder, and an encapsulating casing of wrapped tape and a binder, with a hard outside-finish, surrounding the entire coil.

7. A synchronous dynamo-electric machine comprising a stator-member and a rotor-member, said rotor-member being the field member and having a plurality of salient poles, each pole having a field-coil thereon, each coil comprising a plurality of layers of turns of a rectangular-sectioned, glass-insulated wire, with insulating bonding-material for holding together all of the turns in a single solid mass, and with a plurality of the outer layers of turns stepped back, with fewer turns, so as to be successively shorter, as measured parallel to the center-line of the coil, as the outermost winding-layer is approached during the winding-process, so as to provide a tapered outer configuration having discrete steps at the stepped-back places, a filling of an inorganic insulating cement completely filling said discrete steps of the tapered portion, said cement having a substantially uniformly tapered outer surface, said cement comprising glass-fiber and a binder, and an encapsulating casing of wrapped tape and a binder, with a hard outside-finish, surrounding the entire coil.

8. The invention as defined in claim 6, characterized by said encapsulating casing comprising a first layer of glass-tape, an outer coating of a thermo-setting varnish over said first layer, one or more intermediate layers of cloth-backed mica-tape over said first layer, with the cloth outside, and with an outer coating of a thermo-setting varnish over each of said intermediate layers, and another layer of an impregnated glass-tape over said intermediate layers.

9. The invention as defined in claim 7, characterized by said encapsulating casing comprising a first layer of glass-tape, an outer coating of a thermo-setting varnish over said first layer, one or more intermediate layers of cloth-backed mica-tape over said first layer, with the cloth outside, and with an outer coating of a thermo-setting varnish over each of said intermediate layers, and another layer of an impregnated glass-tape over said intermediate layers.

10. A piece of electrical apparatus, and an encapsulating casing therefor comprising a first layer of glass-tape, an outer coating of a thermo-setting varnish over said first layer, one or more intermediate layers of cloth-backed mica-tape over said first layer, with the cloth outside, and with an outer coating of a thermo-setting varnish over each of said intermediate layers, and another layer of an impregnated glass-tape over said intermediate layers.

11. A piece of electrical apparatus having one or more depressions in its outer surface, and a finishing comprising a filling of an inorganic insulating cement completely filling said depressions, said cement comprising a binder, and an encapsulating casing of wrapped tape and a binder, with a hard outside-finish, surrounding the entire apparatus.

12. A piece of electrical apparatus having one or more depressions in its outer surface, and a finishing comprising a filling of an inorganic insulating cement completely filling said depressions, said cement comprising a particulate filler of reasonably good heat-conducting qualities, and a binder, and an encapsulating casing of wrapped tape and a binder, with a hard outside-finish, surrounding the entire apparatus.

13. A piece of electrical apparatus having one or more depressions in its outer surface, and a finishing comprising a filling of an inorganic insulating cement completely filling said depressions, said cement comprising glass-fiber and a binder, and an encapsulating casing of wrapped tape and a binder, with a hard outside-finish, surrounding the entire apparatus.

14. The invention as defined in claim 11, characterized by said encapsulating casing comprising a first layer of glass-tape, an outer coating of a thermo-setting varnish over said first layer, one or more intermediate layers of cloth-backed mica-tape over said first layer, with the cloth outside, and with an outer coating of a thermo-setting varnish over each of said intermediate layers, and another layer of an impregnated glass-tape over said intermediate layers.

15. The invention as defined in claim 12, characterized by said encapsulating casing comprising a first layer of glass-tape, an outer coating of a thermo-setting varnish over said first layer, one or more intermediate layers of cloth-backed mica-tape over said first layer, with the cloth outside, and with an outer coating of a thermo-setting varnish over each of said intermediate layers, and another layer of an impregnated glass-tape over said intermediate layers.

16. The invention as defined in claim 13, characterized by said encapsulating casing comprising a first layer of glass-tape, an outer coating of a thermo-setting varnish over said first layer, one or more intermediate layers of cloth-backed mica-tape over said first layer, with the cloth outside, and with an outer coating of a thermo-setting varnish over each of said intermediate layers, and another layer of an impregnated glass-tape over said intermediate layers.

17. The method of making a field-coil, comprising the steps of winding said coil, one layer at a time, with a plurality of layers of turns of a rectangular-sectioned, glass-insulated wire, applying a coating of an insulating binding-compound between each layer of turns, said binding-compound comprising a binder which hardens on the application of heat and pressure, a plurality of the outer layers of turns being left with successively fewer turns, during the winding-process, as the outermost winding-layer is approached, so as to provide a tapered outer configuration of the coil, having discrete steps at the places where successive layers are stepped back so as to be shorter, as measured parallel to the centerline of the coil, applying heat and pressure to the coil in such manner as to harden said coil with its stepped-back tapered outer configuration, applying a filling of an inorganic insulating cement so as to completely fill said discrete steps of the tapered portion of the hardened coil, so that the applied cement has a substantially uniformly tapered outer surface, said cement comprising a hardenable binder, before said cement is hardened applying to the coil an encapsulating casing of wrapped tape and hardenable binder, and again applying heat and pressure to the coil in such manner as to harden the hardenable binder of said cement and said encapsulating casing.

18. The method of making a field-coil, comprising the steps of winding said coil, one layer at a time, with a plurality of layers of turns of a rectangular-sectioned, glass-insulated wire, applying a coating of an insulating binding-compound between each layer of turns, said binding-compound comprising a particulate filler and a binder which hardens on the application of heat and pressure, a plurality of the outer layers of turns being left with successively fewer turns, during the winding-process, as the outermost winding-layer is approached, so as to provide a tapered outer configuration of the coil, having discrete steps at the places where successive layers are stepped back so as to be shorter, as measured parallel to the centerline of the coil, applying heat and pressure to the coil in such manner as to harden said coil with its stepped-back tapered outer configuration, applying a filling of an inorganic insulating cement so as to completely fill said discrete steps of the tapered portion of the hardened coil, so that the applied cement has a substantially uniformly tapered outer surface, said cement comprising a particulate filler and a hardenable binder, before said cement is hardened applying to the coil an encapsulating casing of wrapped tape and a hardenable binder, and again applying heat and pressure to the coil in such manner as to harden the hardenable binder of said cement and said encapsulating casing.

19. The method of finishing a rigid piece of electrical apparatus having one or more depressions in its outer surface, said method comprising the steps of applying a filling of an inorganic insulating cement so as to completely fill said depressions, said cement comprising a hardenable binder, before said cement is hardened applying to said piece of apparatus an encapsulating casing of wrapped tape and a hardenable binder, and applying heat and pressure to said taped piece of apparatus in such manner as to harden the hardenable binder of said cement and said encapsulating casing.

20. The method of finishing a rigid piece of electrical apparatus having one or more depressions in its outer surface, said method comprising the steps of applying a filling of an inorganic insulating cement so as to completely fill said depression, said cement comprising a hardenable binder, before said cement is hardened wrapping said piece of apparatus with a first layer of glass-tape, applying an outer coating of a thermo-setting varnish over said first layer, wrapping one or more intermediate layers of cloth-backed mica-tape over said first layer, with the cloth outside, and with an outer coating of a thermo-setting varnish another layer of an impregnated glass-tape over said intermediate layers, and subsequently applying heat and pressure to said taped piece of apparatus in such manner as to harden the hardenable binder of said cement, the coatings of thermo-setting varnish, and the impregnant of said last-mentioned glass-tape layer.

JOHN S. ASKEY.

REFERENCES CITED

The following references are of record in the file of this patent:

UNITED STATES PATENTS

| Number | Name | Date |
| --- | --- | --- |
| 2,133,183 | Baird | Oct. 11, 1938 |
| 2,219,054 | Palm | Oct. 22, 1940 |
| 2,234,560 | Keyes | Mar. 11, 1941 |
| 2,260,024 | Hall | Oct. 21, 1941 |